Sept. 12, 1933.  P. E. TARLTON  1,926,356
FRUIT MARKING MACHINE
Filed July 8, 1931   5 Sheets-Sheet 4

INVENTOR.
PERLE E. TARLTON
BY
White, Prost, Flehr & Lothrop
ATTORNEYS.

Sept. 12, 1933.  P. E. TARLTON  1,926,356
FRUIT MARKING MACHINE
Filed July 8, 1931  5 Sheets-Sheet 5

INVENTOR.
PERLE E. TARLTON
BY
White, Prost, Fisher & Lothrop
ATTORNEYS.

Patented Sept. 12, 1933

1,926,356

UNITED STATES PATENT OFFICE 1,926,356

FRUIT MARKING MACHINE

Perle E. Tarlton, Los Angeles, Calif.

Application July 8, 1931. Serial No. 549,355

1 Claim. (Cl. 101—37)

My invention relates to machines for causing to appear on fruit or other comparable objects a marking or indicium corresponding to the configuration or contour of a marking die. Marking machines of this general type are disclosed in the patent of Louis Neuenschwander, Number 1,421,292 and in my Patent Number 1,658,468 issued Februray 7, 1928.

In such machines there are usually a plurality of electrically heated dies which are successively advanced to marking position. It is preferable that such advancement be intermittent and that the machine be capable of marking a plurality of fruit at one time. Such considerations give rise to a necessity for intermittent motion and in fruit marking machines in the past the intermittent motion mechanism has been the cause of a great deal of noise and wear. Furthermore, such machines have not always been satisfactory with respect to the mechanism for holding the fruit in marking position.

It is, therefore, a general object of my invention to improve marking machines.

Another object of my invention is to provide means for lessening the noise and wear in a marking machine.

Another object of my invention is to provide an improved mechanism for feeding the fruit in a marking machine.

The foregoing and other objects are attained in the embodiment of the invention shown in the drawings, in which Figure 1 is a side elevation of a marking machine constructed in accordance with my invention.

Figure 1:
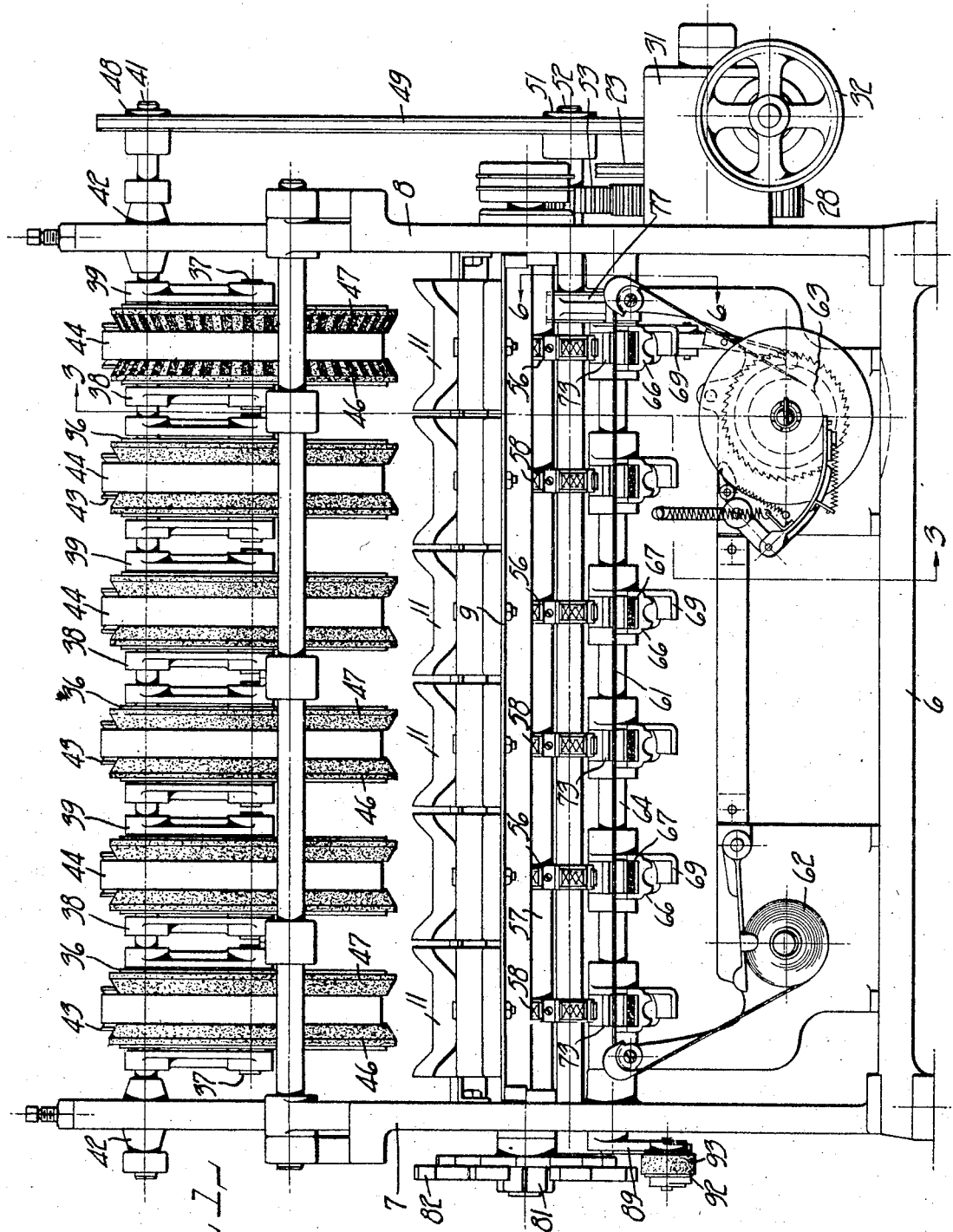
Figure 2:
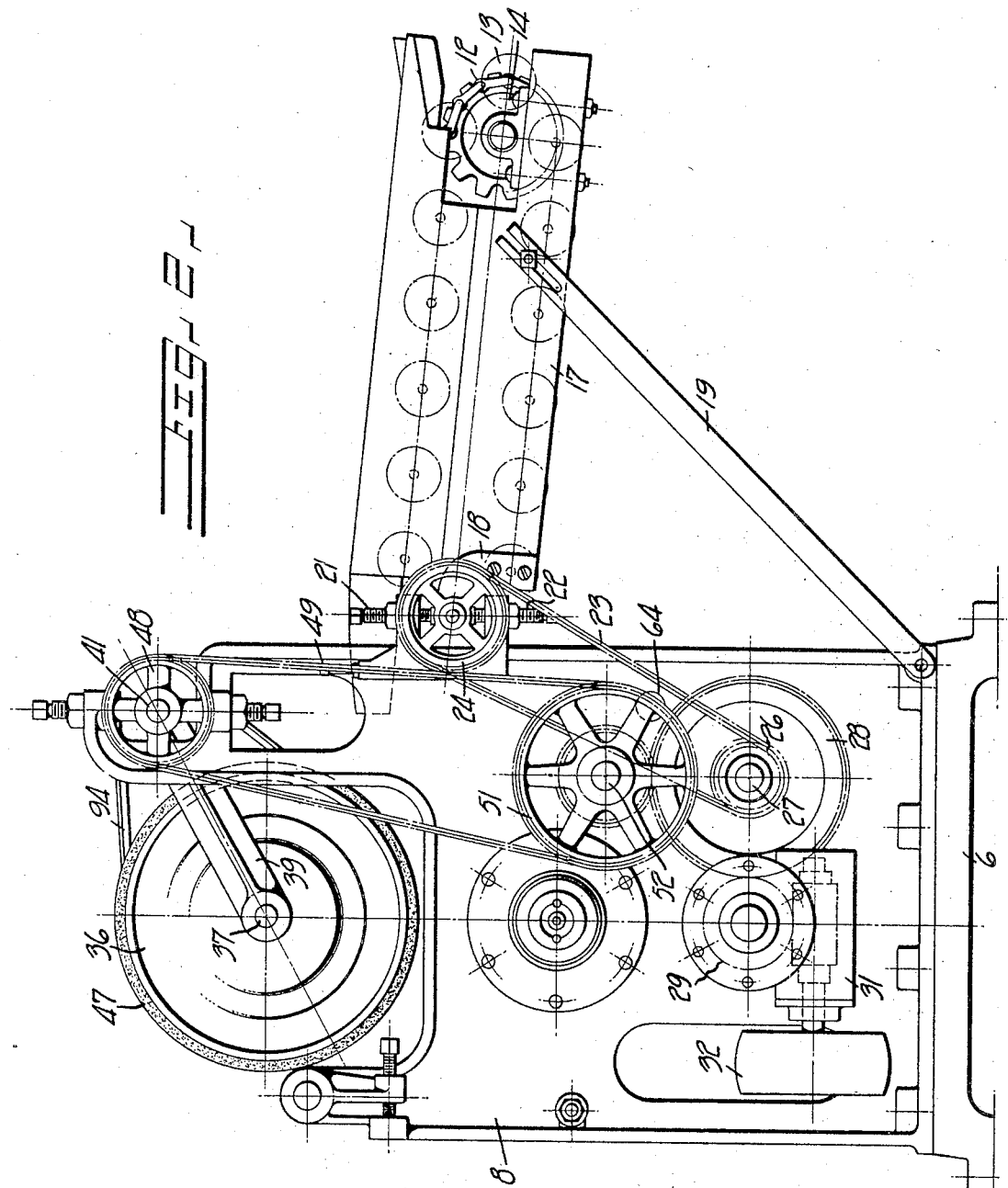
Figure 2 is an end elevation of a marking machine constructed in accordance with my invention.
Figure 3:
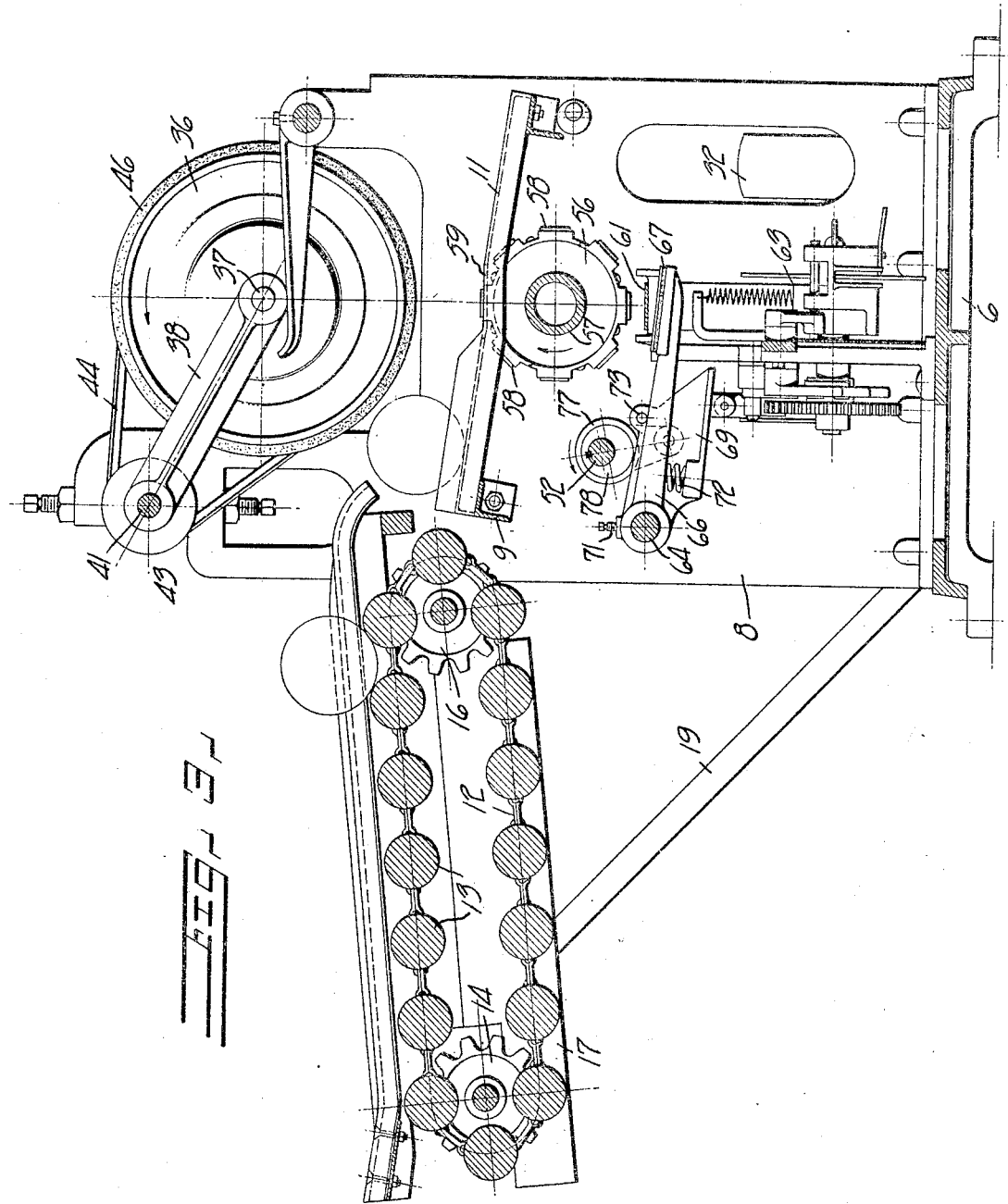
Figure 3 is a cross section, the plane of which is indicated by the lines 3—3 of Figure 1.
Figure 4:
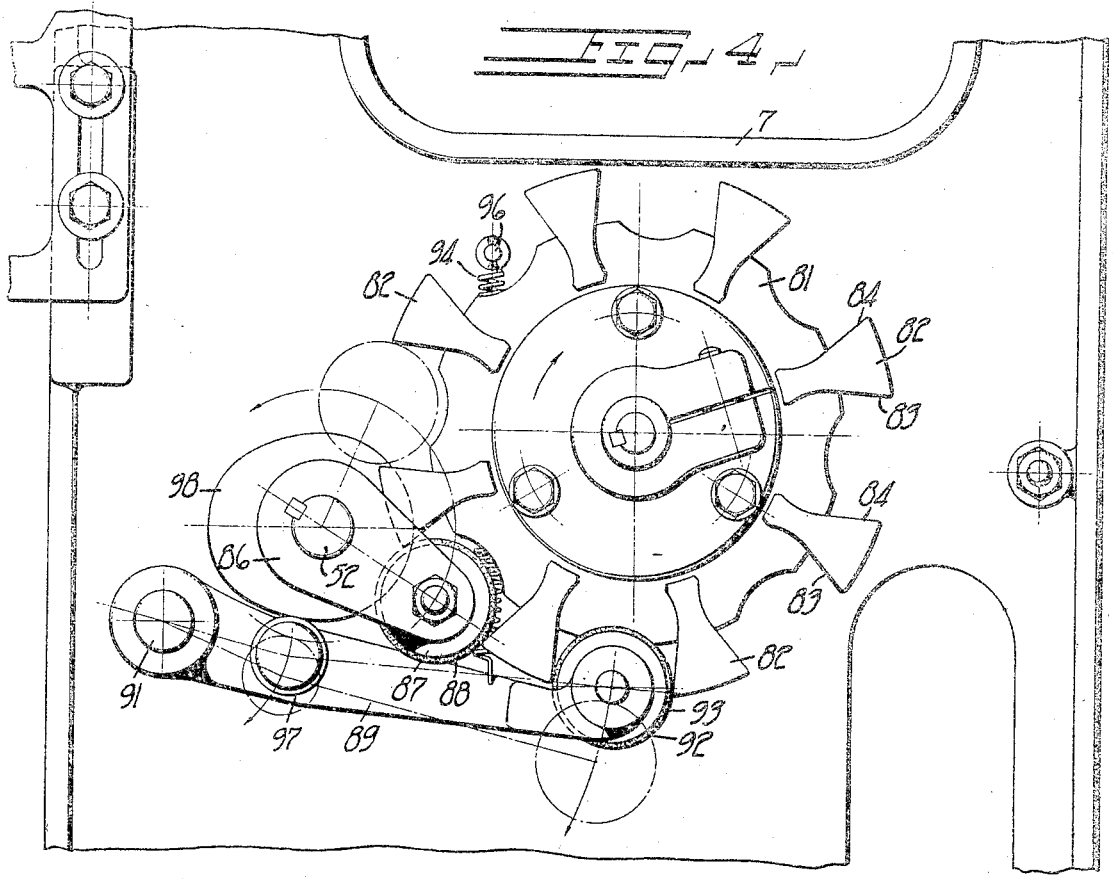
Figure 4 is a detail showing the intermittent motion mechanism in end elevation.
Figure 5:
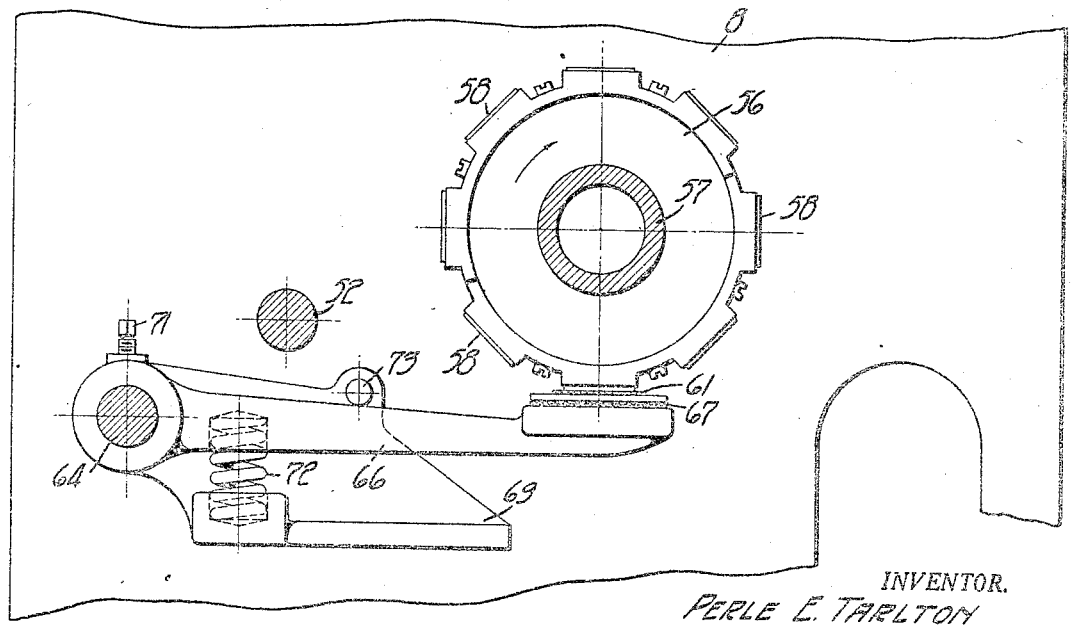
Figure 5 shows in detail a pad arm and a die wheel.
Figure 6:
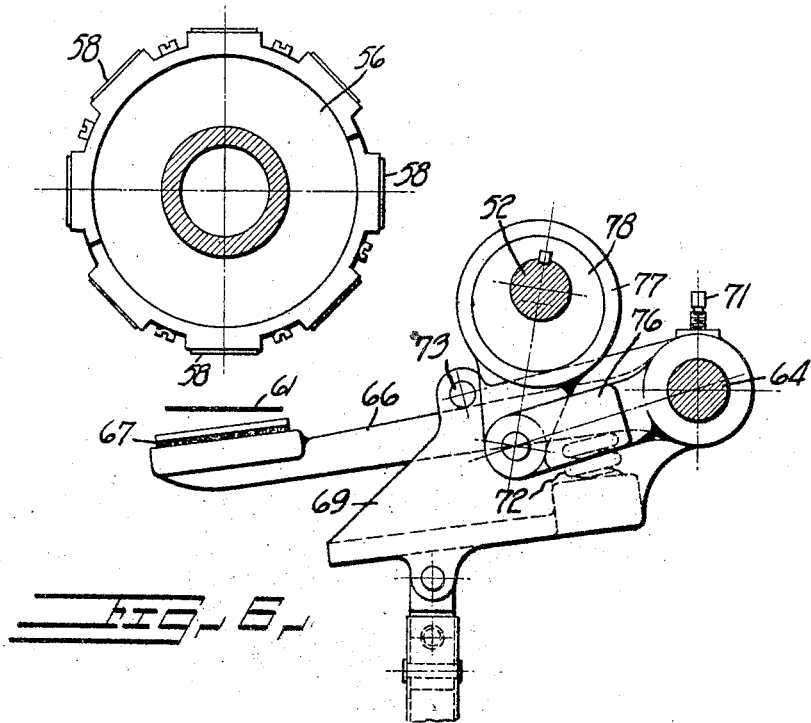
Figure 6 is a cross section on the line 6—6 of Figure 1.
Figure 7:
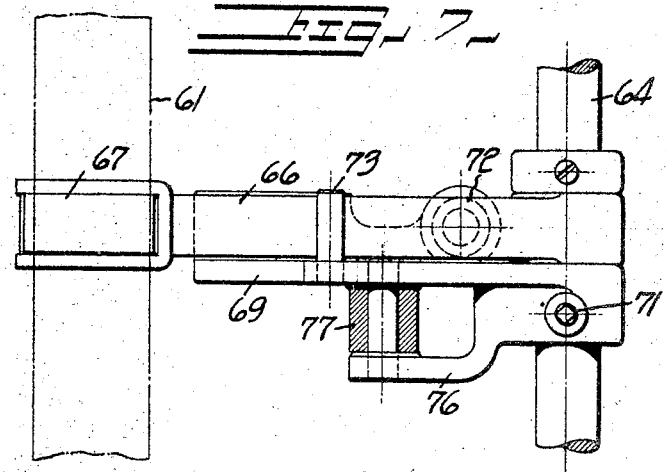
Figure 7 is a plan of the pad arm and associated mechanism as shown in Figures 5 and 6.

In its preferred form, the fruit marking machine of my invention comprises a toothed wheel adapted to be advanced periodically from a continuously rotating driving shaft by a roller mounted on an arm on the driving shaft and engaging the toothed wheel to rotate the toothed wheel a portion of a revolution for each revolution of the driving shaft in order to advance unitarily with the tooth wheel a suitable marking die with which fruit to be marked is held in contact by a wheel having a resilient tire peripherally therearound and driven in a suitable direction to impel a fruit over the die.

In the form of the fruit marking machine shown in the drawings, I provide a base 6 to which is attached a pair of end plates 7 and 8, respectively. Mounted on a suitable sub-frame 9 supported by the end plates 7 and 8 is a plurality of runways 11 each of which is adapted to receive a fruit to be marked.

For feeding fruit to the runways 11 I preferably provide a conveyor including a parallel pair of chains 12 carrying a plurality of rollers 13 and encompassing pairs of sprockets 14 and 16 rotatably mounted in a conveyor frame 17 secured to the end plates 7 and 8 by brackets 18 and braces 19. The brackets 18 are preferably adjustably mounted between set screws 21 and 22 so that the front end of the conveyor can be displaced to tighten or loosen a driving chain 23 connecting a sprocket 24 on the shaft driving the sprockets 16 and a sprocket 26 on a stub-shaft 27 in the end plate 8. Mounted for rotation with the sprocket 26 is a gear 28 meshing with a gear 29 driven by a speed reducer 31 which receives its driving force from a pulley 32 connected to any suitable source of power, not shown.

As fruit is deposited on the conveyor it is advanced thereby and discharged onto the runways 11 along which it rolls gravitally. To assist impelling the fruit along the runways 11 I preferably situate above each runway a wheel 36 mounted on an axle 37. The axle is held by a pair of arms 38 and 39 each of which freely surrounds a common shaft 41 carried in adjustable bearings 42 mounted in the end plates 7 and 8 respectively. The shaft 41 likewise carries a plurality of pulleys 43 around each of which passes a driving belt 44 likewise encompassing the associated one of the wheels 36.

Preferably, each wheel is provided with a pair of conical, resilient tires 46 and 47 which customarily are fabricated of rubber or comparable material and are placed about the periphery of the wheel to define a groove therein in which the belt 44 travels so that the wheel 36 is rotated in accordance with rotation of the shaft 41, and the tires 46 and 47 contacting with the fruit impel the fruit along the runway 11.

The shaft 41 at its extremity preferably carries a sprocket 48 with which meshes a chain 49 extending to a sprocket 51 mounted on a shaft 52 extending entirely through the machine and journalled in the end plates 7 and 8. Likewise mounted on the shaft 52 is a gear 53 meshing with the gear 28 on the stub-shaft 27 so that when the mechanism is operated the wheels 36 are rotated in an appropriate direction to impel the fruit along the runways 11.

In order to impress or otherwise cause to appear on the fruit passing over the runways 11 a suitable mark or indicium I preferably provide a plurality of die wheels 56 mounted on a tube 57 journalled in the end plates 7 and 8. Each die wheel carries at its periphery a plurality of dies 58 of the desired superficial contour. It is customary for the tube 57 to receive an electric heating element, not shown, so that the tube and the die wheels 57 transmit heat to the dies 58. Usually the dies are inked before being positioned in suitable apertures 59 in the runways 11 for marking the fruit and for this purpose an inking ribbon 61 passes from a reel 62 to a reel 63 particularly as shown in Figure 1 and more especially as described and illustrated in detail in my copending application entitled "Marking machine", filed July 8, 1931, with Serial Number 549,354.

In order to cause an inking operation to take place, I preferably provide a lay shaft 64 which is journalled in the end plates 7 and 8 and carries a plurality of pad arms 66 each of which is freely mounted on the shaft and extends to a position beneath the ribbon 61 where it is provided with a resilient pad 67 for causing the ribbon to contact closely with the adjacent die 58. Suitably to operate the pad arms 61, I preferably associate with each of them a frame 69 which at one end encompasses the shaft 64 and moves in unison therewith by virtue of a clamp such as a set screw 71. The frame 69 carries a coil spring 72 bearing against the pad arm 66 and likewise carries a pin 73 adapted to act as a stop for and a driver for the pad arm 66.

The shaft 64 is oscillated by an arm 76 fixed on the shaft 64 and connected to an eccentric strap 77 encompassing an eccentric 78 mounted on and rotated by the shaft 52. For each revolution of the shaft 52 the shaft 64 is oscillated and the frames 69 through the medium of the springs 72 lifts all of the pad arms 66 to cause the ribbon 61 to contact the adjacent dies, after which the pad arms are released and returned to their initial position.

So that the die wheels 56 may be advanced intermittently or step by step successively to position each of the plurality of dies 58 in marking position after inking, I preferably position a toothed wheel 81 at one end of the tube 57. The toothed wheel is provided with a plurality of teeth 82 each of which is provided with a side 83 and a side 84. The sides 83 and 84 on each tooth are preferably parallel to the facing sides on the adjacent teeth 82 to define a parallel walled channel between the successive teeth. Customarily I provide as many teeth as there are dies on each die wheel.

In order that the tube 67 may be moved intermittently with as little noise and shock and corresponding wear as possible I preferably provide at one extremity of the shaft 52 an arm 86 which is fixed for rotation with the shaft 52 and at its extremity carries a roller 87 surfaced with a tire 88 preferably of rubber or comparable material and of a suitable diameter to fit in the parallel walled channel between adjacent teeth 82. Since the shaft 52 rotates uniformly, the roller 87 engages between successive teeth 82 with substantially no motion producing component tangent to the circumference of the toothed wheel 81 but as the shaft 52 continues to rotate, the roller 87 imparts to the wheel a maximum motion in a direction tangent to the circumference of the wheel and finally emerges from the parallel walled channel between two successive teeth 84 with substantially no motion component tangent to the circumference of the wheel 81. In this fashion the tube 57 and all of the die wheels carried by it are started from rest very slowly, are accelerated to maximum speed and are then slowly decelerated to rest with substantially no shock or jar and with practically no noise or wear. The tire 88 on the roller 87 contributes a large share to this effect.

Preferably I provide means for locking the toothed wheel 81, and correspondingly the various dies 58 which move unitarily therewith, against motion during the time that the roller 87 is not effective thereon. To this end I mount a lever 89 on a stud 91 fast in the end plate 87 and provide the lever with a roller 92 carrying a tire 93 similar to the tire 88 and adapted to fit in the parallel walled channels between successive teeth 82 of the wheel 81. A coil spring 94 fastened at one end to a stud 96 in the end plate 7 and at the other end to the lever 89 urges the lever into the appropriate channel between the teeth 82 so that the toothed wheel is normally held against rotation.

In order to unlock the toothed wheel at the proper time so that the roller 87 can be effective thereon I preferably provide the lever 89 with a cam follower 97 which is acted upon by a cam 98 mounted on the shaft 52 and related to the position of the arm 86 in such a fashion that the roller 92 is ejected from between successive teeth 82 just prior or at the same time as the roller 87 enters a channel between successive teeth 82. In this manner the various dies are accurately positioned and are held immovable during the marking operation but are released for periodical advancement without shock or noise.

It is to be understood that I do not limit myself to the form of the fruit marking machine shown and described herein, as the invention, as set forth in the following claim may be embodied in a plurality of forms.

I claim:

A fruit marking machine comprising a wheel, teeth on said wheel, a die coupled for unitary rotation with said wheel, a continuously rotating driving shaft, a crank arm on said driving shaft, a roller on said crank arm, a yielding tire on said roller for engaging the facing sides of adjacent teeth for advancing said wheel a portion of a revolution for each revolution of the driving shaft, a cam on said driving shaft, a pivoted lever, a cam follower on said lever engaging said cam, and a roller having a yielding tire supported by said lever so as to engage the facing sides of adjacent teeth on said wheel in spaced relation to the point of engagement of said crank arm for locking said wheel against rotation when not being advanced by said crank arm.

PERLE E. TARLTON.